US012663040B2

(12) United States Patent
Wiesinger, Jr. et al.

(10) Patent No.: US 12,663,040 B2
(45) Date of Patent: Jun. 23, 2026

(54) SPHERICAL FLUID-FILM BEARING

(71) Applicant: Kingsbury, Inc., Philadelphia, PA (US)

(72) Inventors: Frederick C. Wiesinger, Jr., Lansdale, PA (US); Robert J. Morton, Cinnaminson, NJ (US); Matthew M. Marchione, Richboro, PA (US)

(73) Assignee: KINGSBURY, INC., Philadelphia, PA (US)

( * ) Notice: Subject to any disclaimer, the term of this patent is extended or adjusted under 35 U.S.C. 154(b) by 39 days.

(21) Appl. No.: 18/960,551

(22) Filed: Nov. 26, 2024

(65) Prior Publication Data

US 2025/0180066 A1 Jun. 5, 2025

Related U.S. Application Data

(60) Provisional application No. 63/604,589, filed on Nov. 30, 2023.

(51) Int. Cl.
| | |
|---|---|
| *F16C 17/10* | (2006.01) |
| *F16C 32/06* | (2006.01) |
| *F16C 33/10* | (2006.01) |

(52) U.S. Cl.
CPC .......... *F16C 17/105* (2013.01); *F16C 32/064* (2013.01); *F16C 32/0644* (2013.01); *F16C 32/0648* (2013.01); *F16C 32/0666* (2013.01); *F16C 32/067* (2013.01); *F16C 33/108* (2013.01)

(58) Field of Classification Search
CPC ........ F16C 17/03; F16C 17/035; F16C 17/06; F16C 17/065; F16C 17/10; F16C 17/105; F16C 32/064; F16C 32/0644; F16C 32/0648; F16C 32/0666; F16C 32/067; F16C 32/0674
See application file for complete search history.

(56) References Cited

U.S. PATENT DOCUMENTS

| | | | | |
|---|---|---|---|---|
| 1,117,505 | A | 11/1914 | Kingsbury | |
| 1,275,079 | A * | 8/1918 | Newbigin | F16C 17/06 384/306 |
| 2,785,022 | A * | 3/1957 | Lakey | F16C 17/06 384/303 |
| 3,552,810 | A * | 1/1971 | Korrenn | F16C 32/0644 384/108 |
| 5,449,235 | A * | 9/1995 | Buckmann | F16C 23/043 384/108 |
| 5,957,588 | A * | 9/1999 | Wahl | F16C 17/105 384/108 |

FOREIGN PATENT DOCUMENTS

DE 2802076 A1 * 7/1979

* cited by examiner

*Primary Examiner* — Phillip A Johnson
(74) *Attorney, Agent, or Firm* — COZEN O'CONNOR

(57) ABSTRACT

A spherical fluid-film bearing for supporting a rotating shaft includes a first bearing element and a second bearing element positioned along the rotating shaft in opposite orientations. Each bearing element also includes a rotor having bearing surface formed as a spherical segment. Additional stabilizing features may be included in the spherical fluid-film bearing, including mechanical springs, hydraulic pistons and a high pressure lubrication system.

18 Claims, 7 Drawing Sheets

SPHERICAL FLUID-FILM BEARING

RELATED APPLICATIONS

This application claims priority to U.S. Provisional Application Ser. No. 63/604,589, titled "Spherical Fluid-Film Bearing," filed Nov. 30, 2023, incorporated herein by reference.

BACKGROUND

Fluid-film bearings are used to support axial and radial loads imposed on a shaft or rotor in rotating equipment such as turbines, pumps, compressors, motors, generators and the like. Fluid-film bearings may include both thrust and journal bearings. Thrust bearings typically carry loads exerted along the axial direction of the shaft, while journal bearings can carry loads exerted along the radial direction. One of the loads carried by either type of bearing is the weight of the rotor which can be axial, radial, or a combination of these depending on the orientation of the shaft.

Thrust and journal bearings can be of a fixed geometry design, or comprised of a series of pads sometimes called shoes or segments. In either case, a small clearance is required between the stationary bearing surface and the surface of the rotating shaft. This clearance space is supplied with a viscous fluid that forms a thin film between the two surfaces. Due to several factors including the relative velocity between the rotating surface, the stationary surface, the viscosity of the fluid, and its converging geometry, a hydrodynamic pressure develops that will separate the two surfaces and support the load on this constantly renewing fluid-film that is considerably thinner than the total bearing clearance. This results in a steady state position of the rotor that is not in the center of the radial bearing bore nor in the center of the axial clearance but rather offset. This offset is roughly in the direction of the applied load with the remainder of the clearance opposite of the location of the minimum fluid-film thickness.

One of the challenges in the application of fluid-film bearings, in some installations, comes when the directions of the rotor loads are variable during operation. Variable loads may be due to rotor unbalance. They may also be caused by variable process loading conditions. In these instances, the rotor position can travel through the complete bearing clearance causing unacceptable movement or vibration within the machinery. This orthogonal movement can cause problems involving variation of the misalignment within different portions of the rotor assembly, and even result in damage to the bearings or adjacent components within the machinery. It would therefore be advantageous to create a bearing for these applications that can utilize a portion of the applied forces (radial or axial) to stabilize the orthogonal movement.

U.S. Pat. No. 1,117,505, issued Nov. 17, 1914, shows a single element, tilting pad, fluid-film bearing where the bearing surface is spherically curved and the engaging surfaces of the tilting pads are correspondingly curved. However, this bearing does not address situations in which the axial loading has the potential to reverse direction, or the variation in the radial loading is such that there is a resultant moment on the rotor.

SUMMARY

A spherical fluid-film bearing for supporting a rotating shaft having an axis has a first bearing element and a second bearing element positioned along the rotating shaft in opposite orientations. Each of the first and second bearing elements includes a rotor coupled to the rotating shaft and having a bearing surface formed as a spherical segment running true to rotation around the shaft axis, a plurality of shoe segments having a shoe surface complementary to the bearing surface, a base ring retaining the plurality of shoe segments around the rotor, reacting against a thrust reaction plate; and an oil film between the rotor and the plurality of shoe segments.

Various stabilizing features may be provided in improve stability of the spherical fluid-film bearing, including mechanical springs, hydraulic pistons or a high-pressure lubrication system.

DETAILED DESCRIPTION OF THE EMBODIMENTS

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims. The figures are drawn to illustrate principles but variations may be made to the shapes and designs as shown without departing from the scope of the disclosure.

Figure 1:
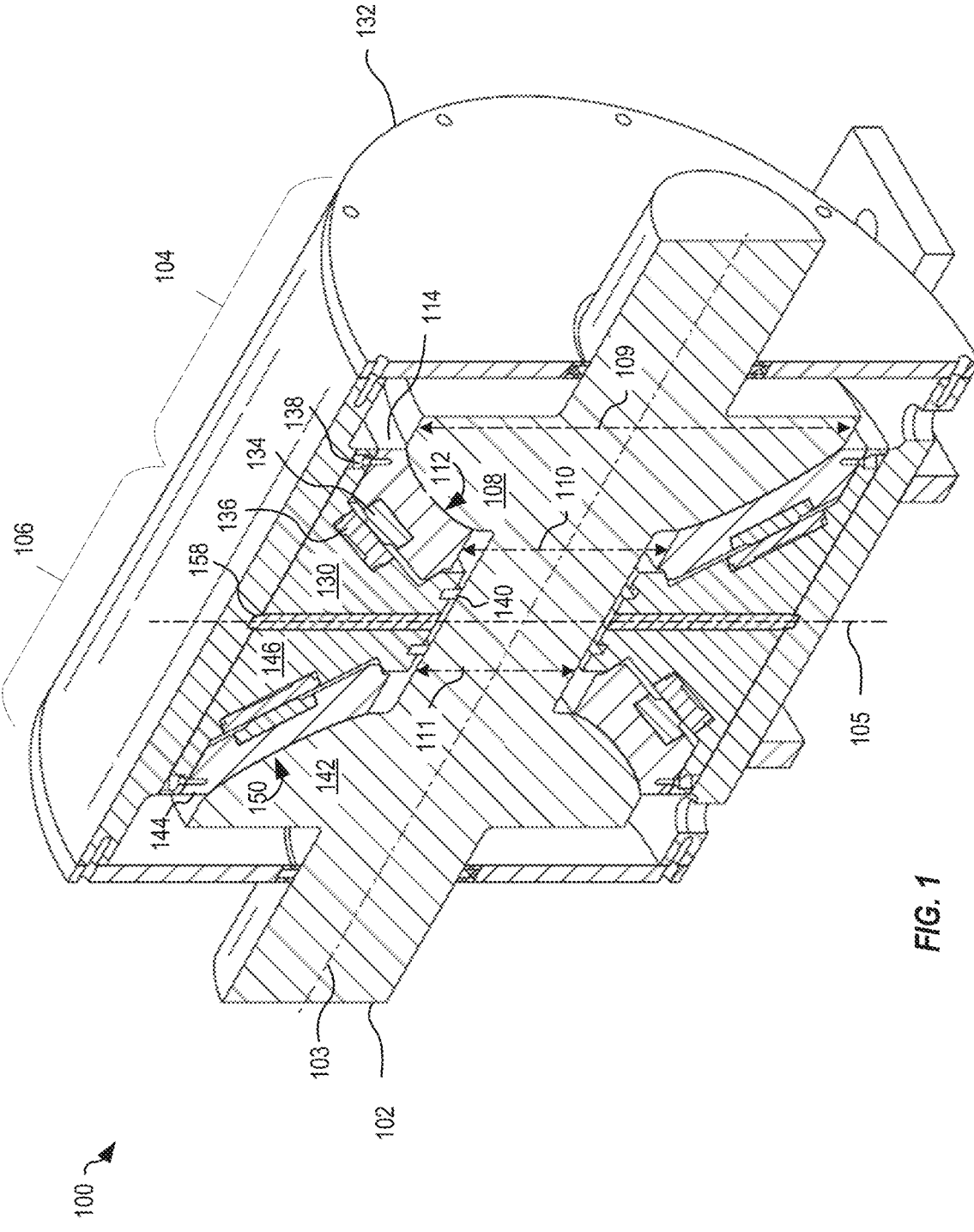
FIG. 1 is a cross-sectional view of a spherical fluid-film bearing, in embodiments.
Figure 2:
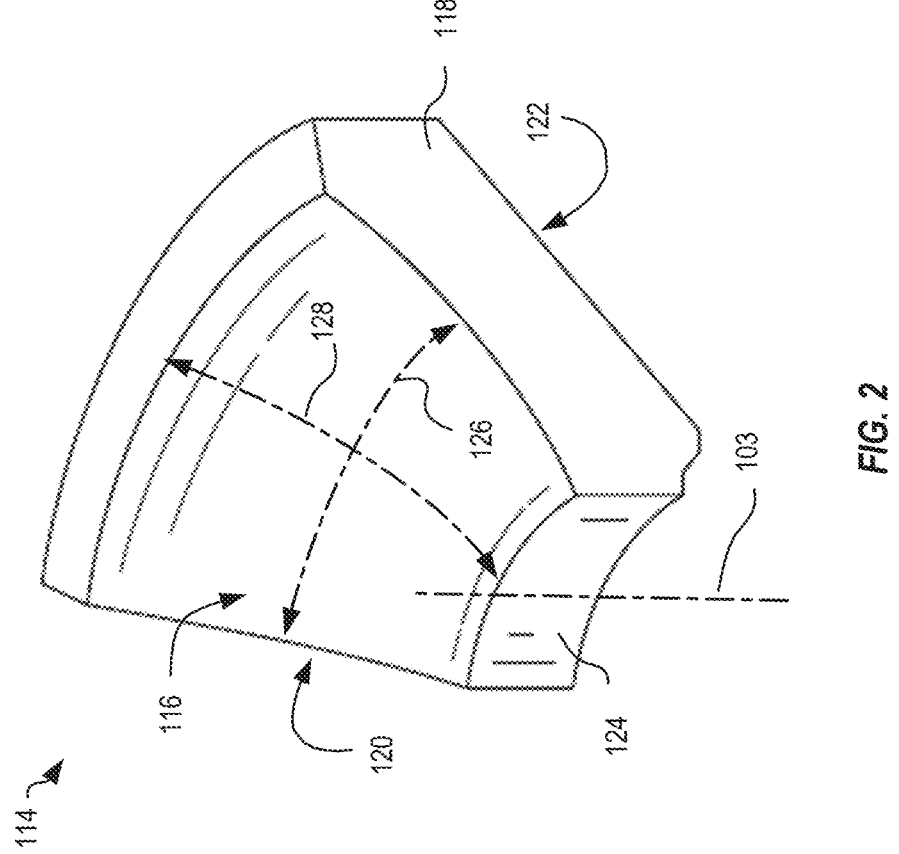
FIG. 2 is a perspective view of a shoe segment for use in the spherical fluid-film bearing of FIG. 1.

FIG. 1 is a cross-sectional view of spherical fluid-film bearing 100. Bearing 100 supports axial, or thrust, and radial loads imposed on shaft 102 and includes two bearing elements. Shaft 102 rotates around axis 103. First bearing element 104 includes a first rotor 108 having a first bearing surface 112 which is formed as a spherical segment running true to rotation around axis 103. As used herein, a spherical segment is formed by cutting a sphere with two concentric circles. The first circle represents the maximum diameter 109 of first rotor 108. The second circle represents the inside diameter 110 of the bearing and is between the diameter 111 of the shaft 102 as generally measured at the center 105 of the housing and the inside diameter of the shoe segment 114 of FIG. 2.

First rotor 108 is surrounded by a plurality of first shoe segments 114. An individual shoe segment 114 is shown in more detail in FIG. 2. Each first shoe segment 114 has a first shoe surface 116 having a curvature that is part of a spherical segment and sides 118 and 120. Each first shoe segment 114 also has a back surface 122 opposite first shoe surface 116. The plurality of shoe segments 114 are positioned around first rotor 108 by placing each shoe segment into the first base ring 130 to form a convex spherical surface that is complementary to the first bearing surface 112 of first rotor 108. The bore surface 124 of each shoe segment 114 is closer to axis 103 and is selected to allow shaft 102 to pass through with a reasonable amount of clearance.

The number of shoe segments used in a particular embodiment is selected based on parameters such as diameter 111 of shaft 102, outside diameter 109 of bearing 100, required load capacity, etc. For example, six, eight or ten segments may be used, but there is no limit to the number of segments that may be provided. In embodiments, for an individual shoe segment, the length 126 to width 128 proportion is approximately unity. In other words, length 126 is approximately equal to width 128. This ratio will help to identify the number of segments required for the bearing assembly. For example, a bearing assembly with a relatively small shaft passing through the center of the bearing assembly may require only six stationary segments per side. Yet an assembly that requires a larger shaft to pass through due to bending or torque requirements may need ten or more stationary segments per side. Additional consideration of handling and maintenance of this overall assembly may give cause for the number and size of the segments to be varied for different bearing assemblies.

In embodiments, first shoe surface 116 is comprised of or coated with a material that will provide reduced friction and wear during start up conditions. This may be a soft metal such as bronze, babbitt material as described in ASTM B23, or a custom alloy or polymer. The segment and any coating will be designed such that it is strong enough to support all the loads applied to each segment while avoiding both damage and injurious deflections.

The plurality of first shoe segments 114 are retained in first base ring 130 so that they are adjacent but not touching each other. Back surface 122 of each shoe segment 114 will include a spherical support or other mechanism that will allow each segment to independently pivot in response to changes in the hydrodynamic pressure resulting from changes in operating loads and speeds. The load applied to each segment is then transferred to the housing 132 of the bearing through base ring. In embodiments, Shoe support 134 of first shoe segment 114 and base ring plug 136 of base ring 130 may be formed of stronger material such as hardened tool steel that helps transfer the load. In embodiments, first shoe segments 114 are able to pivot in any direction, but are prevented from rotating with rotor 108. Maintaining first shoe segments 114 in a certain rotational position around base ring 130 may be accomplished by using a screw or pin 138 between base ring 130 and segment 114. However, other mechanisms are possible as long as they prevent rotation of the segments. As discussed and illustrated herein, first base ring 130 and second base ring 146 are shown as two separate elements. In embodiments, they may be formed as a single element that spans the distance between first shoe segment 114 and second shoe segment 144. In addition, base ring 130 may be formed from halves or segments around the circumference of the bearing.

The spherical portion of the rotor 108 is machined to a tight tolerance and surface finish to allow the proper formation of a self-renewing oil film that will separate the first bearing surface 112 of rotor 108 and the first shoe surface 116 of first shoe segments 114 while minimizing friction during rotation of shaft 102 within the bearing 100. First shoe surface 116 of each stationary segment is also precision machined to a radius established based on the dimensions of the rotating spherical section to aid in the formation of proper hydrodynamic pressure that will carry all the loads imposed on the bearing assembly. Oil seal 140 may be provided in a clearance space between shaft 102 and an inner diameter of base ring 130 to control the level and flow of the oil to and from bearing 100. The outside diameter of the bearing may be selected to provide the desired load capacity for bearing 100.

Second bearing element 106 is similar to first bearing element 104. It includes second rotor 142 having a second bearing surface 150 which is formed as a spherical segment of a hemisphere. Second bearing element 106 also includes a plurality of second shoe segments 144 and a second base ring 146. The discussion above applies equally to second bearing element 106, with the exception that all components of second bearing element 106 have an orientation with respect to shaft 102 that is the opposite of first bearing element 104. Therefore first base ring 130 of first bearing element 104 and second base ring 146 second bearing element 106 face in opposite directions along shaft 102, as shown in FIG. 1. First base ring 130 and second base ring 146 are between first rotor 108 and second rotor 142 such that backside surfaces of each base ring abut each other at thrust reaction plate 158. In embodiments, thrust reaction plate 158 is generally perpendicular to shaft 102 at the center 105 of bearing 100. Thrust reaction plate 158 extends into a slot in housing 132 to transmit a thrust load on the bearing to the housing.

For purposes of illustration in FIG. 1, first rotor 108 and second rotor 142 are depicted as machined directly on shaft 102. However, both first rotor 108 and second rotor 142 may be separate annular rings coupled to shaft 102. In addition, each of the rotors may be solid rings or split rings for ease of assembly.

Figures 3, 4:
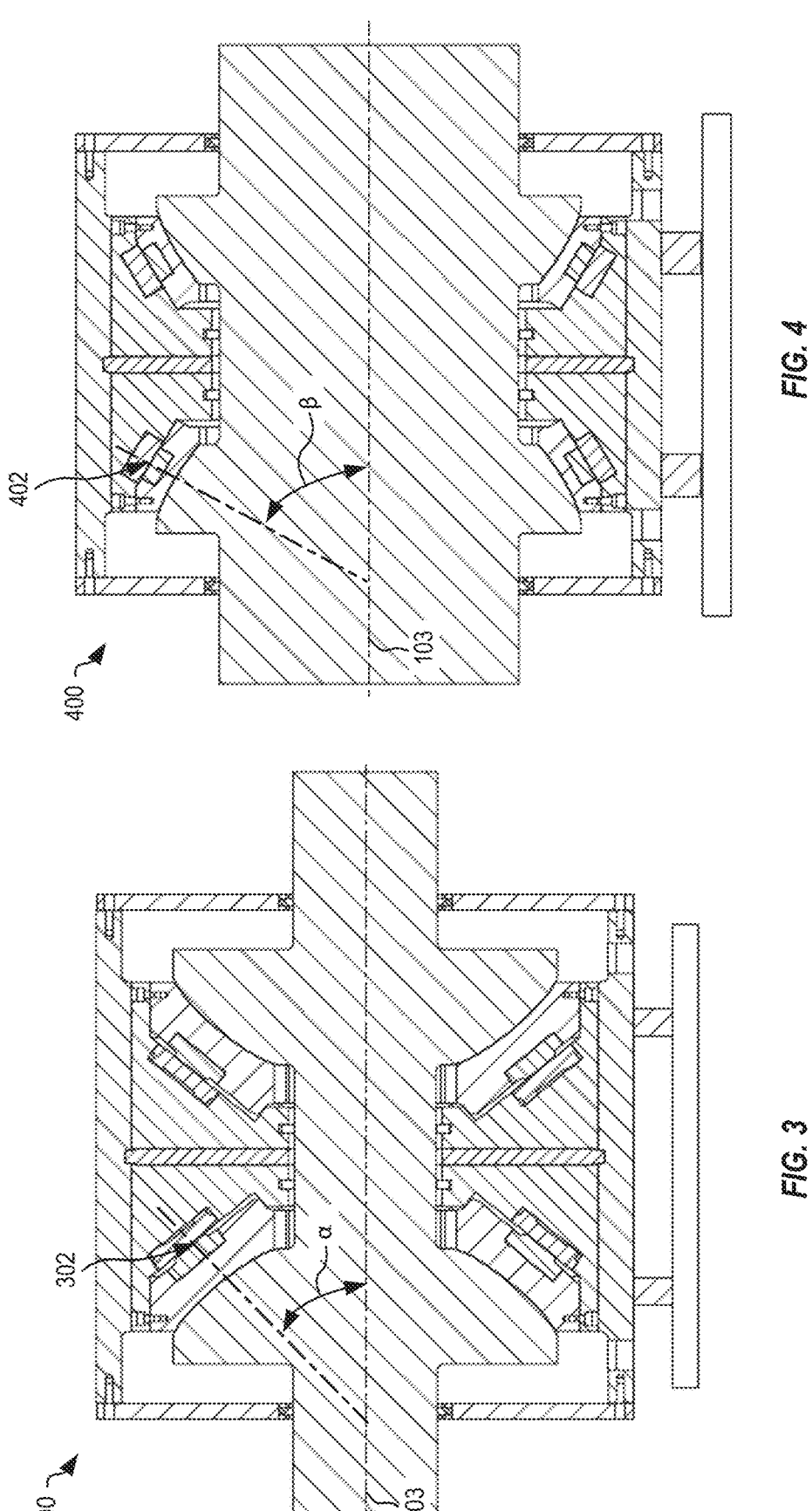
FIG. 3 is a cross-sectional view of another spherical fluid-film bearing, in embodiments.
FIG. 4 is a cross-sectional view of yet another spherical fluid-film bearing, in embodiments.

FIGS. 3 and 4 are cross-sectional views of spherical fluid-film bearings adjusted for various applications and load conditions. The angle between the rotational axis 103 of the shaft and the pivot points for the stationary segments can be adjusted depending on the relationship of the desired thrust and journal load capacities. FIG. 3 shows a spherical fluid-film bearing 300 that is an example of bearing 100 and is designed for high thrust, or axial load. FIG. 4 shows a spherical fluid-film bearing 400 that is an example of bearing 100 and is designed for high radial load. The angle α between rotational axis 103 and pivot point 302 in FIG. 3 is smaller than the angle β between axis 103 and pivot point 402 in FIG. 4. This means that pivot point 302 is closer to axis 103 and better able to compensate for thrust loads along the shaft while pivot point 402 is closer to perpendicular from axis 103 and thus, better able to compensate for radial loads. In addition, the total surface area of the bearing surfaces as well as the diameter of rotating shaft 102 may be changed depending on the expected load.

Figure 5:
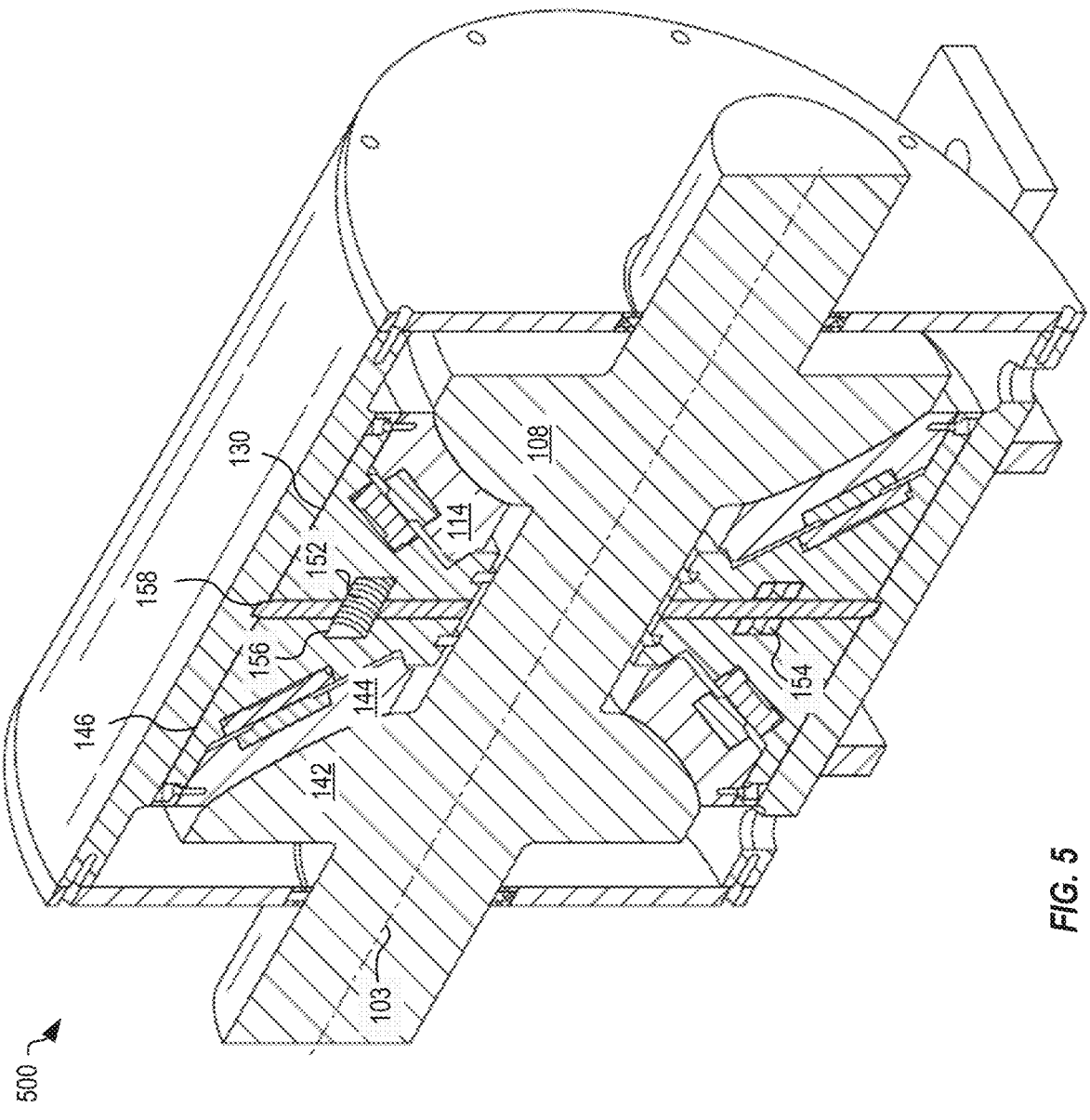
FIG. 5 is a cross-sectional view of a spherical fluid-film bearing with spring-based stability features, in embodiments.

FIG. 5 is a cross-sectional view of a spherical fluid-film bearing 500 having additional features to address instability due to axial or radial load reversals. Bearing 500 is an example of bearing 100. The features discussed with respect to FIG. 5 may be included in any of the bearings discussed herein. As shown in FIG. 5, a plurality of mechanical springs 152 are placed between first base ring 130 and second base ring 146. In embodiments, a recess 156 may be formed in a side of each of the base rings that to receive spring 152. The recess is generally parallel to axis 103 so that the base rings, and thus, the shoe segments, are urged apart from each and towards their respective rotors. In embodiments, recess 156 may also extend though thrust plate 158. A series of mechanical springs may be placed between the two bearing elements around the circumference of bearing 500 in alignment with each shoe segment. Any number of springs may be used as needed to provide and maintain forces between the opposing bearing elements. In embodiments, the springs used in FIG. 5 may be a coil spring 152 or a Belleville spring 154 depending on the desired loading and space available within the design. The force generated by these springs would stabilize the axial and radial rotor position.

Figure 6:
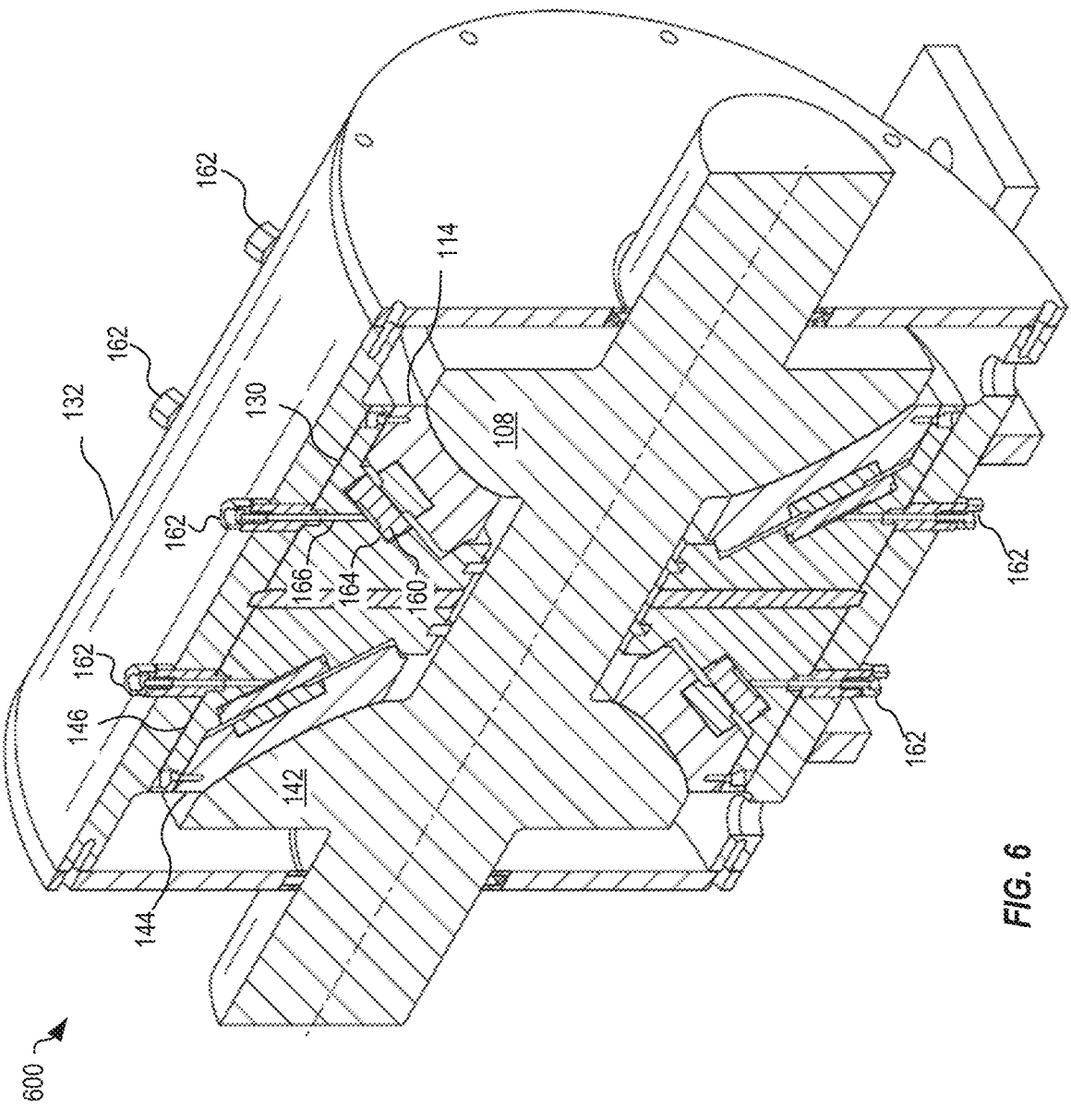
FIG. 6 is a cross-sectional view of a spherical fluid-film bearing with hydraulic piston stability features, in embodiments.

FIG. 6 is a cross-sectional view of a spherical fluid-film bearing 600 with hydraulic piston stability features. Bearing 600 is an example of bearing 100, although features discussed with respect to FIG. 6 may be included in any of the bearings discussed herein. A plurality of hydraulic pistons 160 are located in counterbores 164 in base rings 130 and 146. Each hydraulic piston 160 is positioned behind each of first shoe segments 114 and second shoe segments 144. In this embodiment, the piston 160 replaces the base ring plug 136 of FIG. 1. High pressure oil is supplied behind each piston 160 through port 162 in housing 132 and a drilled hole 166, and collects in a recess behind piston 160. In embodiments, ports 162 and drilled holes 166 may be spaced evenly around housing 132 and aligned with a center of each shoe segment as shown in FIG. 6. However, this placement is flexible. Ports 162 may be placed at any convenient place on housing 132 and drilled holes 166 may be at any angle depending on the structure of housing 132 and surrounding equipment.

Each piston 160 is pressurized to provide a direct force to each first shoe segment 114 and each second shoe segment 144. Each piston 160 may be independently controlled to adjust for variable load based on known or sensed operating conditions. In embodiments, one or more sensors (not shown) are provided to detect operating conditions of the bearing and any equipment connected to shaft 102. Further, processing components (not shown) are provided to process sensor input and provide control signals move pistons 160 into and out of counterbore 164, which may be based on sensor input and/or program instructions. Counterbores 164 shall be machined to be normal to the angle between the rotational axis 103 of the shaft and the pivot points for the stationary segments as shown, for example, in FIGS. 3 and 4.

The advantage of this design is twofold: First, there is the ability to control the amount of axial force generated between the bearing elements from the outside of the machine and optimize this force based on the operational need through a simple feedback circuit. Second, the hydraulic system would also provide a direct measurement to ensure each stationary segment is carrying the design load.

Figure 7:
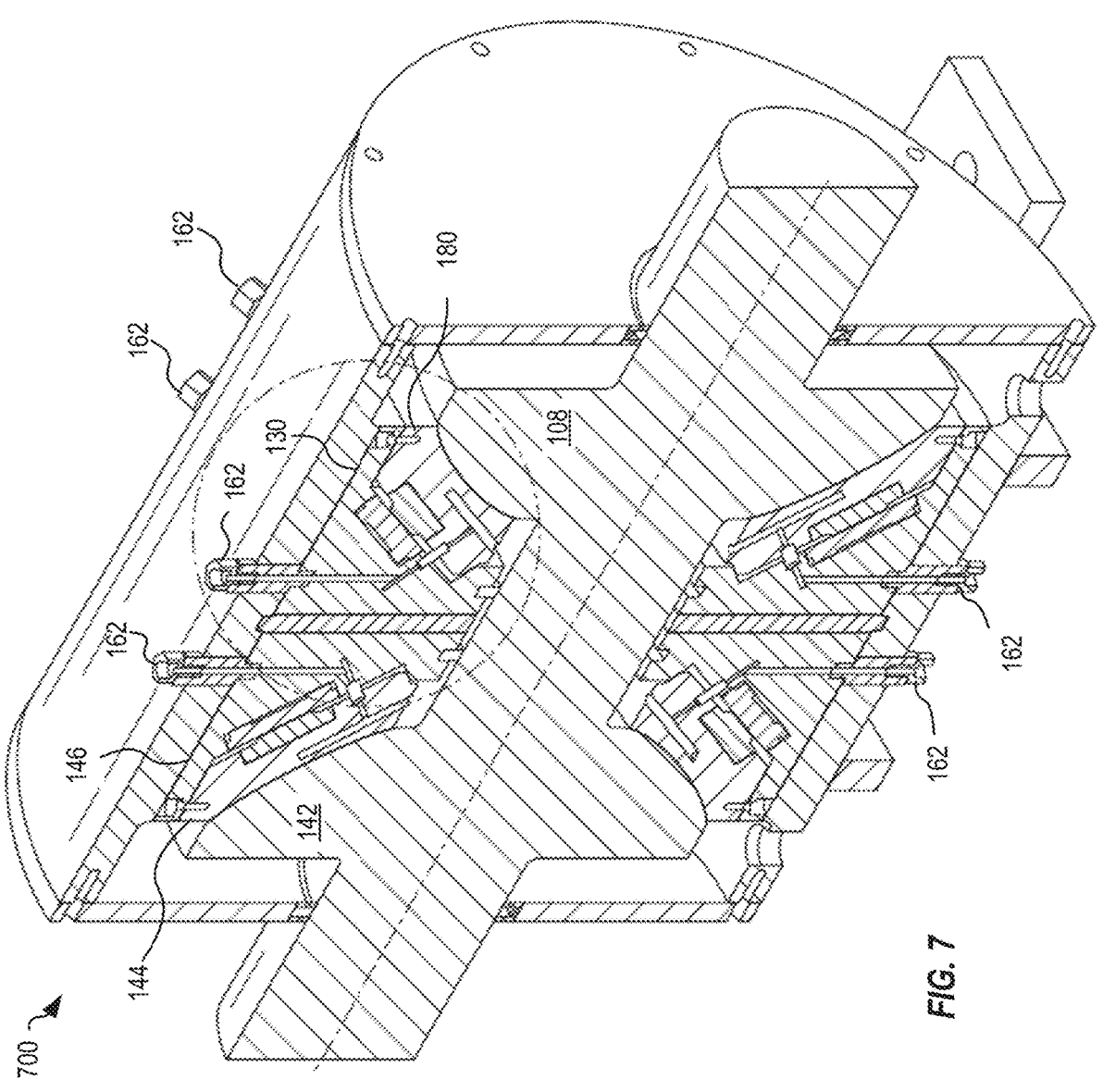
FIG. 7 is a cross-sectional view of a spherical fluid-film bearing with high-pressure lubrication stability features, in embodiments.
Figure 9:
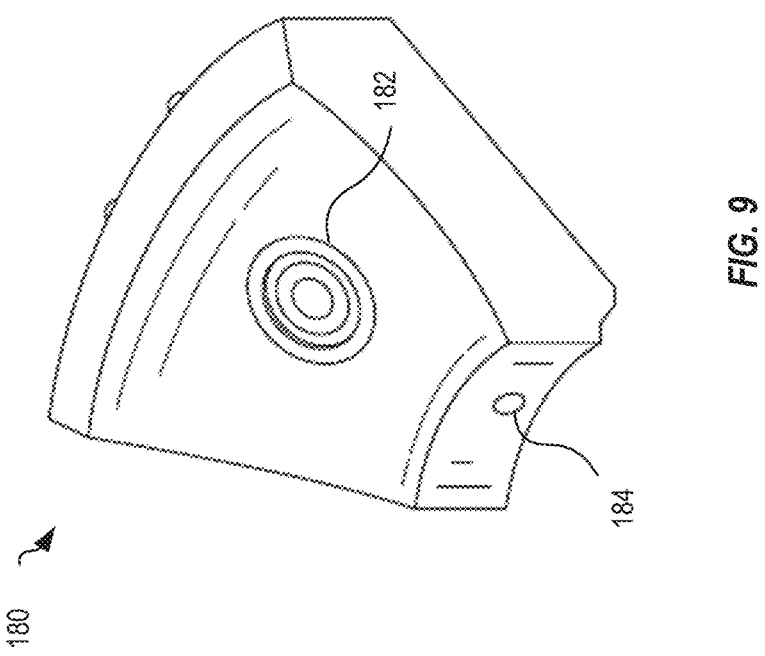
FIG. 9 is a perspective view of a shoe segment for use in the spherical fluid-film bearing of FIG. 7.
Figure 8:
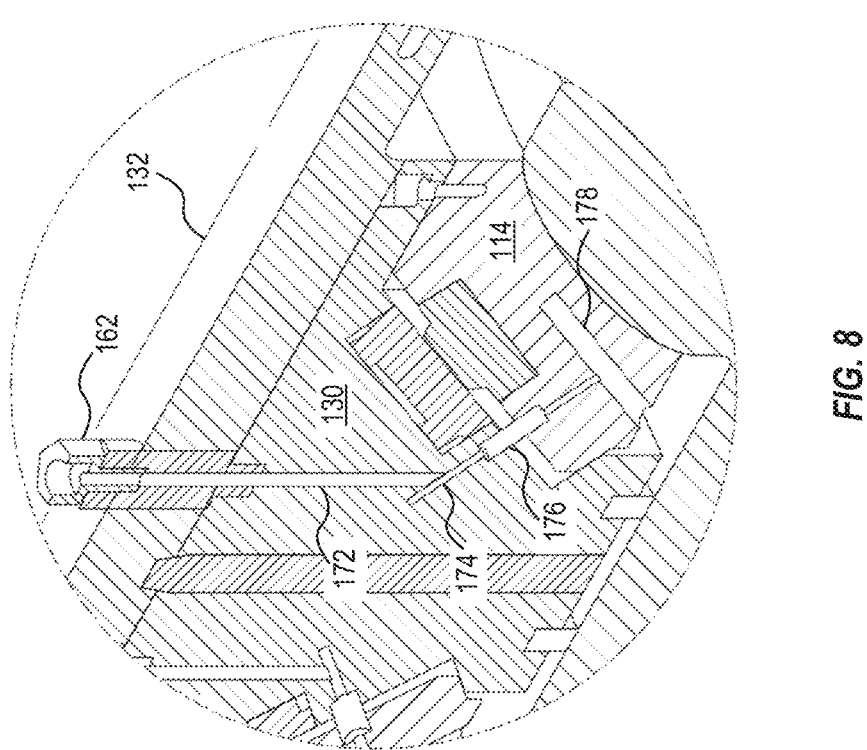
FIG. 8 is an enlarged view of a portion of the bearing of FIG. 7.

FIG. 7 is a cross-sectional view of a spherical fluid-film bearing 700 with high-pressure lubrication stability features. FIG. 8 is an enlarged view of a portion of the bearing and FIG. 9 is a perspective view of a shoe segment for use in the spherical fluid-film bearing of FIG. 7. FIGS. 7-9 are best viewed together in the following discussion. Bearing 700 is an example of bearing 100, although the features discussed with respect to FIG. 7 may be included in any of the bearings discussed herein. Like numerals in FIG. 7 represent like or similar elements in FIG. 6 unless otherwise indicated. Bearing components may have the same general construction as discussed above with reference to FIG. 1, but with additional features as shown in FIG. 7 and discussed below.

Bearing 700 includes features that extend the oil circulation system of the fluid-film bearing to a high-pressure lubrication (HPL) system. This system provides sufficient pressure directly into the oil film between the rotor and the shoe segments to carry the load applied to the bearing. In embodiments, the HPL system includes a port 162 for connection to a source of pressure outside bearing 700. Pressurized oil is injected through port 162 into a series of channels 172, 174, 176 and 178 in housing 132, base ring 130 and shoe segment 180, shown in more detail in FIG. 9. Although only one section of bearing 700 is shown in FIG. 8, a plurality of channels would be provided in the base rings and each shoe segment of bearing 700 so that each shoe segment may be independently controlled as discussed above for the hydraulic pistons 160 in FIG. 6. Further, although FIGS. 7 and 8 show a specific position and orientation of channels, this is for purposes of illustration only and other arrangements are within the scope disclosed herein. Oil is transferred from the stationary base ring 130 to the shoe segment 114 through a feed tube 176 that contains the flow and yet allows the shoes to pivot freely.

FIG. 9 shows a shoe segment 180 for use in bearing 700. Shoe segment 180 is an example of shoe segments 114 and 144, with additional machining 182 and 184 to provide for the flow of pressurized oil from channel 178 into the oil film area between the shoe segment and the rotor.

In embodiments, the HPL system provides the benefit of reduced friction and wear during startup of bearing 700 as well as allowing the hydrostatic pressure to the unloaded bearing to operate as a hydrostatic/hydrodynamic hybrid bearing applying opposing loads to the otherwise inactive bearing segments.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A spherical fluid-film bearing for supporting a rotating shaft having an axis, comprising:
  a first bearing element comprising:
    a first rotor coupled to the rotating shaft and having a first bearing surface formed as a spherical segment running true to rotation around the shaft axis;
    a plurality of first shoe segments having a first shoe surface complementary to the first bearing surface;
    a first base ring retaining the plurality of first shoe segments around the first rotor, reacting against a thrust reaction plate; and
    a first oil film between the first rotor and the plurality of first shoe segments; and
  a second bearing element comprising:
    a second rotor coupled to the rotating shaft and having a second bearing surface formed as a spherical segment also running true to rotation around the shaft axis;

a plurality of second shoe segments having a second shoe surface complementary to the second bearing surface;

a second base ring retaining the plurality of second shoe segments around the second rotor, reacting against the thrust reaction plate; and a second oil film between the second rotor and the plurality of second shoe segments;

wherein the first bearing element and the second bearing element are facing in opposite directions along the rotating shaft.

2. The spherical fluid-film bearing of claim 1, wherein the first base ring and the second base ring each abut the thrust reaction plate, and further comprise a recess for receiving a spring for exerting force along the axis to urge the first base ring and the second base ring apart from each other.

3. The spherical fluid-film bearing of claim 2, wherein the spring is a coil spring or a Belleville spring.

4. The spherical fluid-film bearing of claim 1, further comprising:

a plurality of first hydraulic pistons extending through the first base ring to the plurality of first shoe segments, wherein the plurality of first hydraulic pistons corresponding to the plurality of first shoe segments; and a plurality of second hydraulic pistons extending through the second base ring to the plurality of second shoe segments, wherein the plurality of second hydraulic pistons corresponding to the plurality of second shoe segments.

5. The spherical fluid-film bearing of claim 4, further comprising:

one or more sensors to detect operating conditions of the bearing and any equipment connected to the rotating shaft; and a processing component for controlling the first and second hydraulic pistons in response to input from the sensors.

6. The spherical fluid-film bearing of claim 1, further comprising:

a high-pressure lubrication (HPL) system for supplying pressurized oil to the first oil film and the second oil film.

7. The spherical fluid-film bearing of claim 6, wherein the HPL system further comprises a plurality of channels in each bearing element.

8. The spherical fluid-film bearing of claim 1, wherein the plurality of first shoe segments and the plurality of second shoe segments are configured to pivot independently at a pivot point between each shoe segment and a respective base ring.

9. The spherical fluid-film bearing of claim 8, wherein an angle between the axis of the rotating shaft and the pivot point for each shoe segment may be changed based on the load experienced by the bearing.

10. The spherical fluid-film bearing of claim 1, wherein the plurality of first shoe segments form a convex spherical surface complementary to the first bearing surface and the plurality of second shoe segments form a hemispherical convex surface complementary to the second bearing surface.

11. The spherical fluid-film bearing of claim 10, wherein the convex spherical surface comprises a friction-minimizing material.

12. The spherical fluid-film bearing of claim 1, wherein the first base ring and the second base ring are between the first rotor and the second rotor.

13. The spherical fluid-film bearing of claim 12, wherein the first base ring and the second base ring have an inner diameter sized to provide clearance for the rotating shaft.

14. The spherical fluid-film bearing of claim 13, further comprising at least one oil seal between the first and second base rings and the rotating shaft.

15. The spherical fluid-film bearing of claim 1, further comprising a housing, where the first base ring and the second base ring are coupled to the housing.

16. The spherical fluid-film bearing of claim 1, wherein a length and a width of the first shoe surface and the second shoe surface are approximately equal.

17. The spherical fluid-film bearing of claim 1, further comprising six first shoe segments and six second shoe segments.

18. The spherical fluid-film bearing of claim 1, further comprising eight first shoe segments and eight second shoe segments.

* * * * *